United States Patent [19]

Arai et al.

[11] Patent Number: 4,991,560
[45] Date of Patent: Feb. 12, 1991

[54] HOT-WIRE AIR FLOW METER AND INTERNAL COMBUSTION ENGINE PROVIDED WITH SAME

[75] Inventors: Nobukatsu Arai, Tsuchiura; Toshifumi Usui, Katsuta; Tetsuo Matsukura, Katsuta; Shinya Igarashi, Katsuta; Youichi Furuhashi, Katsuta, all of Japan

[73] Assignee: Hitachi, Ltd., Tokyo, Japan

[21] Appl. No.: 487,611

[22] Filed: Mar. 1, 1990

[30] Foreign Application Priority Data

Mar. 7, 1989 [JP] Japan .................... 1-054182

[51] Int. Cl.⁵ .................. G02M 51/00; G01F 1/68; G01M 19/00; G01P 5/12
[52] U.S. Cl. .................. 123/494; 73/118.2; 73/204.21; 73/204.22
[58] Field of Search .......... 123/494; 73/118.2, 204.11, 73/204.21, 204.22

[56] References Cited

U.S. PATENT DOCUMENTS

| | | | |
|---|---|---|---|
| 4,527,423 | 7/1985 | Sato et al. | 73/118.2 |
| 4,592,326 | 6/1986 | Karino et al. | 123/494 |
| 4,624,134 | 11/1986 | Nagano | 73/118.2 |
| 4,759,213 | 7/1988 | Porth et al. | 73/118.2 |
| 4,793,176 | 12/1988 | Sato et al. | 73/118.2 |
| 4,887,577 | 12/1989 | Arai et al. | 123/494 |
| 4,911,009 | 3/1990 | Maeda et al. | 73/204.11 |

Primary Examiner—Tony M. Argenbright
Assistant Examiner—Robert E. Mates
Attorney, Agent, or Firm—Ladas & Parry

[57] ABSTRACT

A hot-wire air flow meter for detecting air flow intake has a main passage (21) and a generally parallel sub-passage (31) for bypassing said main passage, and located in the sub-passage is a hot-wire element (2a) for detecting air flow intake. A dished member (34) is located upstream from an inlet (31a) of the sub-passage, the dished member having a base portion adjacent the sub-passage inlet and an upstream projecting edge (30a) extending from said base portion. The upstream extending edge (30a) at least partially surrounds the inlet (31a) and is located between the sub-passage inlet and the main passage, the effect of the dished member tending to stabilize air flow entering the sub-passage so that the air flow is less affected by bends in pipework upstream from the air flow meter.

23 Claims, 8 Drawing Sheets

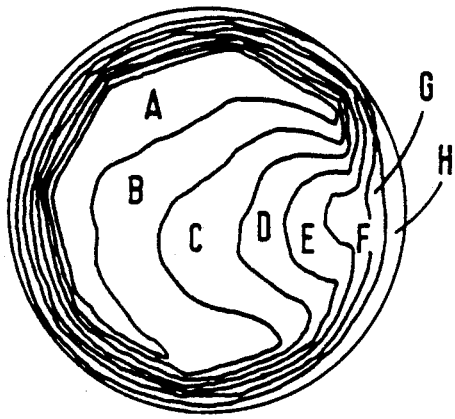
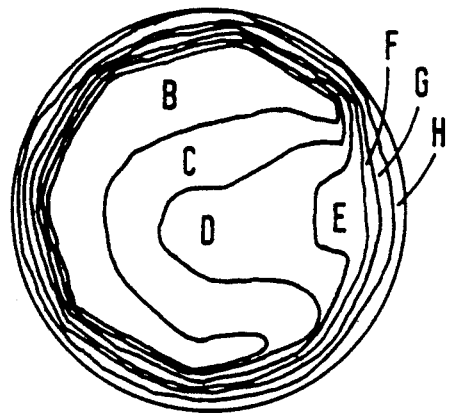
Fig. 6 (EXAMPLE 1)  Fig. 7 (EXAMPLE 2)
A: 8–7 m/s  B: 7–6 m/s  C: 6–5 m/s  D: 5–4 m/s
E: 4–3 m/s  F: 3–2 m/s  G: 2–1 m/s  H: 1–0 m/s
(AVERAGE WIND VELOCITY 5 m/s)
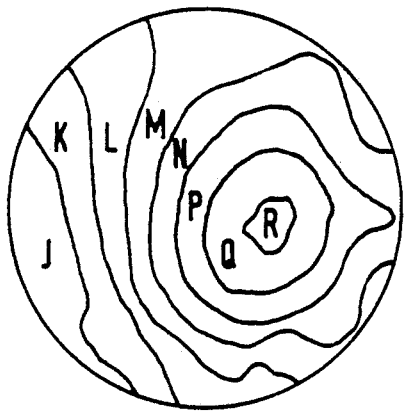
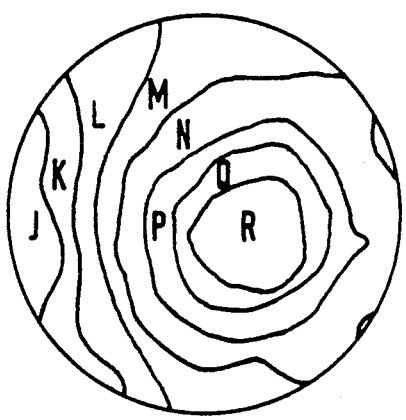
Fig. 8 (EXAMPLE 1)  Fig. 9 (EXAMPLE 2)
J: 0 – –1 mmH$_2$O   K: –1 – –2 mmH$_2$O   L: –2 – –3 mmH$_2$O   M: –3 – –4 mmH$_2$O
N: –4 – –5 mmH$_2$O   P: –5 – –6 mmH$_2$O   Q: –6 – –7 mmH$_2$O   R: –7 – –8 mmH$_2$O
DIFFERENTIAL PRESSURE WITH ATMOSPHERIC PRESSURE (1 mmH$_2$O ≒ 9.8 Pa)

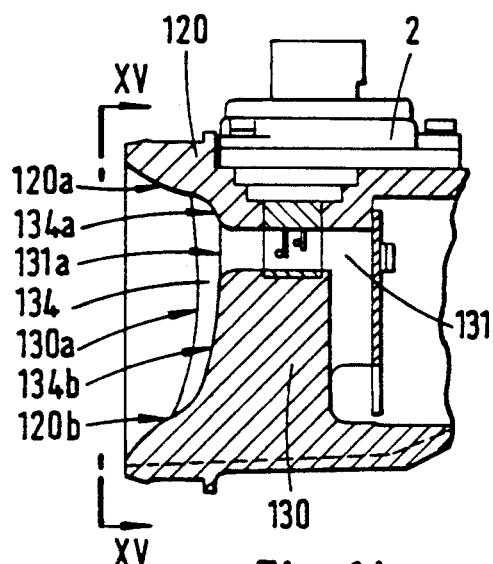
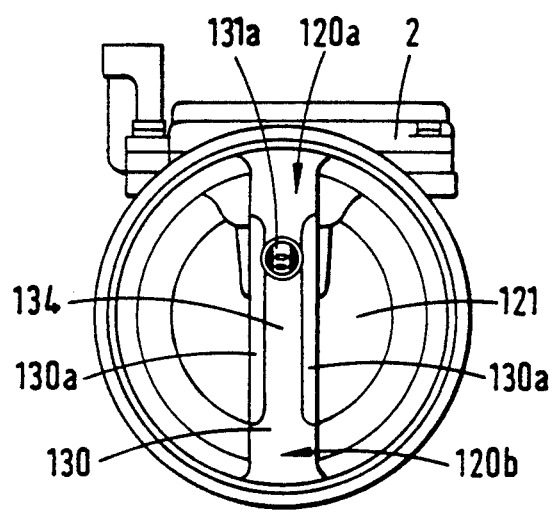
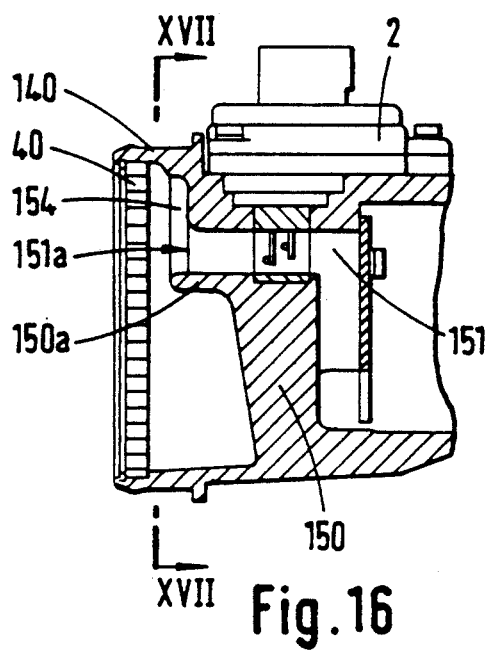
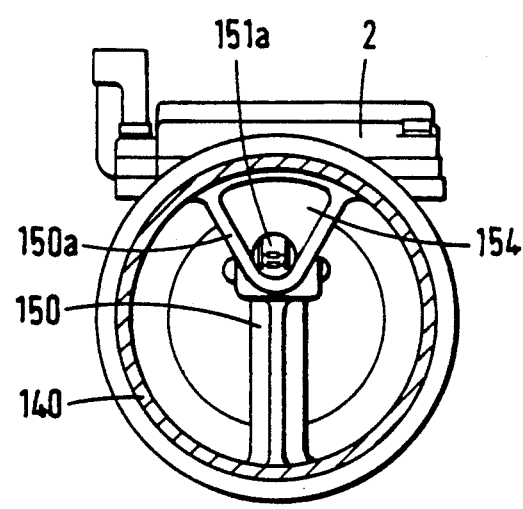

HOT-WIRE AIR FLOW METER AND INTERNAL COMBUSTION ENGINE PROVIDED WITH SAME

BACKGROUND OF THE INVENTION

1) Field of the Invention

The present invention relates to a hot-wire air flow meter and to an internal combustion engine provided with such a meter. More particularly, the invention relates to a hot-wire air flow meter suitable as an air flow meter which constitutes the intake system of an automobile internal combustion engine and detects the amount of intake air thereof so as to control the amount of fuel injected.

2) Description of Related Art

In a conventional hot-wire air flow meter, a main air flow passage has a sub-passage disposed in a central portion thereof and a hot-wire element is provided in the sub-passage, as disclosed in Jap. Pat. Laid-Open Nos. 50520/1975, 146369/1975 and 69021/1980. In a hot-wire flow meter having the structure such as that disclosed in Jap. Pat. Laid-Open No. 50520/1975, however, the hot-wire element is defenseless against blowback due to engine back fire caused when, for example, the timing element is mistimed. As a countermeasure, a structure of protecting the hot-wire element from back fire is disclosed in Jap. Pat. Laid-Open Nos. 146369/1975 and 69021/1980. However, due to the nonlinearilty of a hot-wire element, that is the thermal conductivity is not proportional to the voltage frequency output thereof, a hot-wire element generally has an output characteristic which is lowered in spite of the increased average flow rate when the hot-wire element is placed in a large flow of pulsating air caused by piston movement in an internal combustion engine. All of the above-described prior art air flow meters have the disadvantage that they cannot accurately detect the flow rate of a pulsating air flow.

As disclosed in Jap. Utility Model Laid-Open No. 135127/1981 and Jap. Pat. Laid-Open No. 185118/1985, in some hot-wire air flow meters, a sub-passage with a hot-wire element provided therein is disposed in the main passage such that the fluid resistance of the sub-passage downstream from the hot-wire element is increased as a countermeasure to back firing or in order to accurately detect the pulsating flow and the entrance opening of the sub-passage is parallel to or almost parallel to the main air current. In other words, the dynamic pressure of the back flow which acts on the entrance opening is reduced and the flow going toward the hot-wire element is attenuated, thereby enhancing the resistance to back fire. Since the downstream exit of the sub-passage is directly in line and substantially parallel to the main air flow current, the flow in the sub-passage fluctuates due to the static pressure which is caused by the mixture of the flow from the sub-passage and main passage at this portion. This appears as noise on the hot-wire element. Although high-frequency noise is cut off to a certain degree, the noise caused by the above-described fluctuation becomes a problem in controlling the system when the engine is driven at a low speed. In addition, the known structure, has a long axial length making installation in an automobile difficult and is made of a number of parts making the cost of manufacture high.

There are hot-wire air flow meters in which a sub-passage with a hot-wire element provided therein is disposed outside of the main passage as a countermeasure for back fire and to stabilise the output of the hot-wire element with respect to the intake pulsation, as disclosed in Jap. Pat. Laid-Open Nos. 13557/1972, 109816/1983, 76012/1981 and 28017/1986. The embodiments described in these specifications have the disadvantage that the detection error in the flow rate is increased due to thermal conditions such as the thermal conduction from the engine, the heat of the hot-wire element itself, or the heat of the engine and the rise in temperature in the engine compartment caused by solar radiation, as pointed out in Jap. Pat. Laid-Open No. 76012/1981. That is, since the sub-passage portion is provided in the interior of the body wall which has a large heat capacity and does not have a wide heat transfer area with respect to the air flow, the temperature of the air flow in the sub-passage is influenced by the temperature of the passage wall and the difference in temperature between the air flow in the sub-passage and the air flow in the main passage is increased. This leads to an increase in the error in the measurement of the intake air flow.

Jap. Pat. Laid-Open No. 250260/1985 discloses a structure in which the entrance of the sub-passage has a bell shaped mouth having a large throat area ratio so as to reduce the error in measurement even when the air flow upstream of the entrance of the sub-passage is greatly deflected. This structure, however, does not effect an improvement on the measurement accuracy (the stabilisation of the distribution of the air flow in the main passage and the sub-passage) if the air flow upstream of the entrance of the sub-passage has a large speed distribution and a large pressure distribution. This fact is prominent when the sub-passage is provided eccentrically with the main passage. In addition, this structure has the disadvantage that the flow rate in the sub-passage is increased when there is a large amount of air flow, so that a large amount of dust adheres to the hot-wire element, thereby varying the output characteristic with time.

In the above-described prior art, some have a structure unsuitable for practical use because they do not withstand engine back fire and strong blow-back of the engine and they cannot accurately detect average flow rate of a pulsating flow. Moreover some cannot accurately measure the flow rate when the flow varies due to changes in thermal conditions to which the air flow meter is exposed, nor when different shapes of the constituent parts of the intake pipe passage are arranged upstream of the air cleaner, duct, etc.; additionally since the noise of the output of the hot wire element is large, sufficient control of the engine when driven at the optimum ratio is not carried out, thereby obstructing cleaning of the exhaust gas of the engine, reduction in fuel cost, and improvement in operability, etc. Other prior art meters increase the pressure loss in the intake pipe passage and the weight of the system including the engine, thereby obstructing any reduction in fuel cost, and reduce the space in the engine compartment, etc.

It is an object of this invention to provide a hot-wire air flow meter which achieves a reduction in fuel cost of the engine system and occupies less space in the engine compartment, and which is capable of detecting accurately the amount of intake air under various conditions.

It is another object of the present invention to provide an internal combustion engine which is capable of the optimum control of the air fuel ratio by using the above-described hot-wire air flow meter.

SUMMARY OF THE INVENTION

According to one aspect of this invention there is provided a hot-wire air flow meter for detecting air flow intake includes a main passage, a sub-passage bypassing said main passage, a hot-wire element located in said sub-passage for detecting said air flow intake, and a dished member upstream from an inlet of said sub-passage, said dished member having a base portion adjacent said sub-passage inlet and an upstream projecting edge extending from said base portion, said projecting edge at least partially surrounding said inlet and being located between said inlet and said main passage, whereby said dished member tends to stabilise air flow entering said sub-passage by said inlet.

Advantageously the base portion is substantially orthogonal to the longitudinal axis of the main passage and said base is substantially flat, and in one embodiment said edge entirely surrounds said inlet.

In an embodiment said sub-passage has a longitudinal axis which is substantially parallel with but eccentric from the longitudinal axis of the main passage and said sub-passage is positioned toward one side of the base portion, and advantageously said sub-passage is positioned adjacent said edge.

The edge may extend toward the longitudinal axis of said main passage or the edge may extend across the longitudinal axis of said main passage. In an embodiment of the invention said dished member base portion and a projecting edge are oblong in shape, and in such an embodiment a major part of said oblong is eccentric with respect to the longitudinal axis of said main passage.

In another embodiment of the invention the base portion and the projecting edge are fan-shaped with the axis of the fan locating the inlet. In a further embodiment of the invention the main passage has a radially inwardly directed wall, inclined inwardly downstream, and the projecting edge extendingly projects upstream, and in such further embodiment the distance said edge projects upstream from said inclined wall is approximately twice the depth of the dished member.

In yet another embodiment of the invention the edge adjoins an inner wall of said main passage, said inner wall of said main passage having an inlet thereof formed in the shape of a venturi.

In an alternative embodiment the sub-passage is coaxial with the longitudinal axis of the main passage, and the dished member advantageously has a base and a projecting edge which are both oval with the minor axis of said oval being orthogonal to the longitudinal axis of said main passage.

Preferably the depth of the dished member is substantially the same as the radius of the sub-passage.

Where the sub-passage has a longitudinal axis which is substantially parallel with an eccentric from the longitudinal axis of the main passage, advantageously the sub-passage extends from said dished member to a radially extending passage, a radially outer end of said radial passage communicating with a downstream end of said main passage, and preferably a baffle plate is provided to partially cover a downstream outlet of the radial passage.

A flexible closure means may be provided at the downstream end of said sub-passage, said flexible closure member being arranged to open or close the outlet of said sub-passage in dependence upon the direction of air pressure.

In a further embodiment of the invention said sub-passage is parallel to but eccentric from the longitudinal axis of the main passage and arcuately located partly about an entrance of said sub-passage at the upstream end thereof is a plate, said plate being positioned between the sub-passage and main passage, a base part of the dished member being positioned radially outwardly from the sub-passage with respect to the main passage longitudinal axis, said base part being substantially orthogonal with respect to said main passage longitudinal axis. In said still further embodiment the downstream end of said sub-passage is arcuately formed about the main passage and enters into the main passage at a circumferential portion thereof angularly spaced from said sub-passage. Conveniently said sub-passage is formed in a bridge extending radially of the main passage longitudinal axis, said bridge being formed integrally with a body of said meter, and said main passage being divided into two parts by said bridge.

According to another aspect of this invention there is provided an internal combustion engine including a hot-wire air flow meter in accordance with said one aspect, a speed sensor for detecting the rotational speed of said internal combustion engine, at least one fuel injector for injecting fuel, and a control unit for controlling the amount of fuel injection by receiving output signals of said hot-wire air flow meter and said speed sensor and calculating said amount of fuel injection corresponding to the amount of intake air.

The edge on the periphery of the entrance opening of the sub-passage averages the variation in the flow rate distribution and the pressure distribution of the flow, and so stabilises the rate of the flow rate of the air flow in the sub-passage with respect to the total flow rate.

By providing a sub-passage for a hot-wire air flow meter with a hot-wire element therein in parallel with a main passage, the heat exchange of the sub-passage wall with respect to the main current is enlarged and the temperature of the sub-passage wall is maintained constantly at a temperature close to the temperature of the intake air. Also, dynamic pressure of the backward flow on the sub-passage may be prevented from being applied directly to the exit opening thereof when the engine backfires or blows back.

Furthermore, by providing a member for preventing backward flow from entering the sub-passage, the fluctuation in static pressure due to the mixture of the flow at the respective exits of the sub-passage and the main passage is reduced in the vicinity of the outflow portion, thereby stabilising the difference in the pressure between the entrance and the exit of the sub-passage. Thus, the flow within the sub-passage is stabilised and the fluctuation of the flow is eliminated.

BRIEF DESCRIPTION OF THE DRAWINGS

The invention will now be described by way of example with reference to the accompanying drawings in which:

FIGS. 6 and 7 show examples of distribution of the flow rate on the upstream side of the air flow meter in the structure shown in FIG. 1;

FIGS. 8 and 9 show examples of distribution of the pressure in the examples shown in FIGS. 6 and 7;

FIG. 14 is a sectional view of a fourth embodiment of a hot-wire air flow meter in accordance with this invention;

FIG. 15 is a sectional view of the embodiment shown in FIG. 14, taken along the line XV—XV;

FIG. 16 is a sectional view of a fifth embodiment of a hot-wire air flow meter in accordance with this invention;

FIG. 17 is a sectional view of the embodiment shown in FIG. 12, taken along the line XVII—XVII;

In the Figures like reference numerals denote like parts.

DESCRIPTION OF THE PREFERRED EMBODIMENTS

Figure 1:
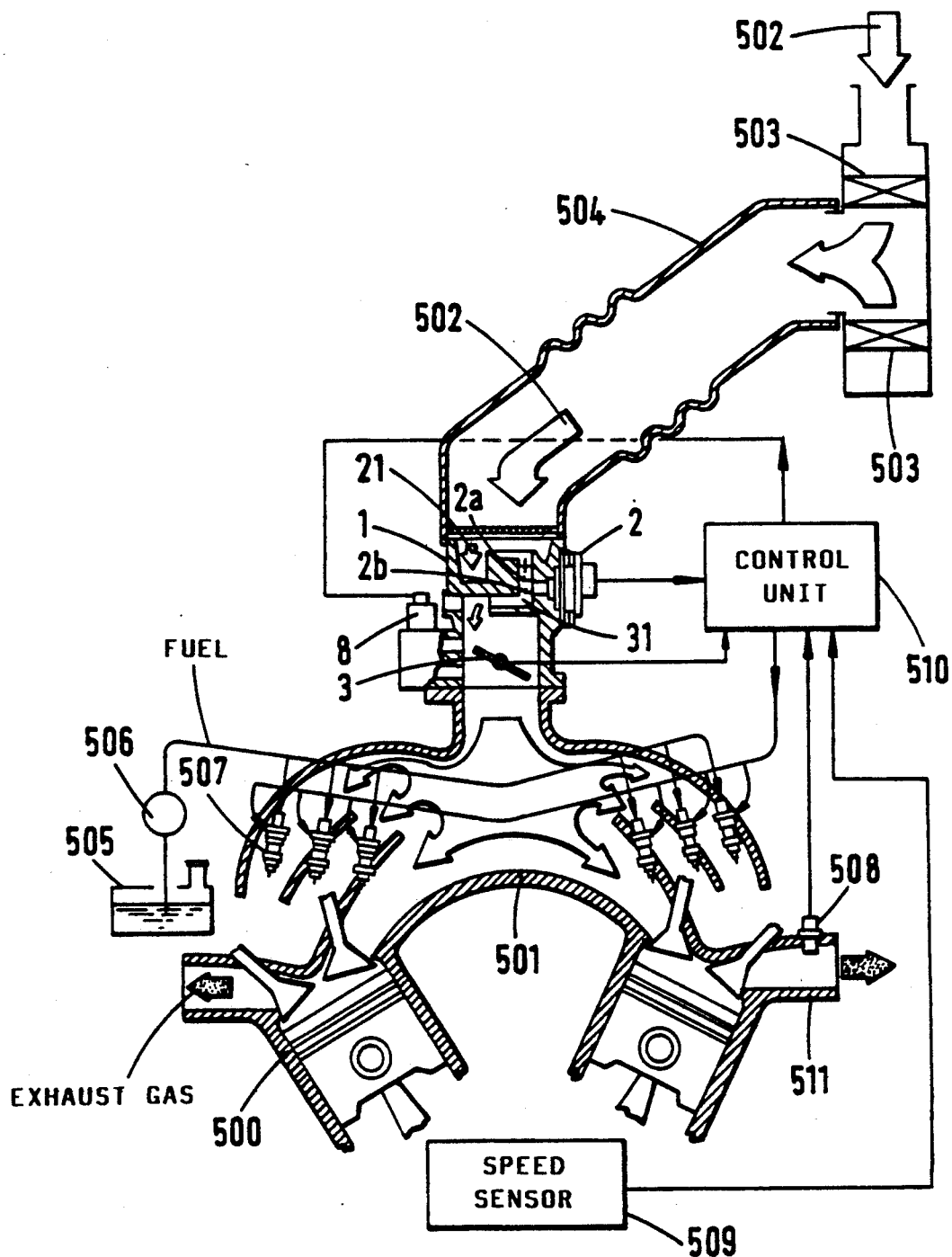
FIG. 1 shows the structure of an internal combustion engine using a hot-wire air flow meter according to the present invention.

FIG. 1 shows an embodiment of an electronically controlled type internal combustion engine to which a hot-wire air flow meter of the present invention is applied.

In FIG. 1 the internal combustion engine has a cylinder 500 to which is sucked intake air 502 through an air filter 503, and is supplied thereto through an intake duct 504, the hot-wire air flow meter 1 and an intake manifold 501. The air flow meter 1 is provided with a sub-passage 31 projecting into a main passage 21, and in the sub-passage 31 is provided a hot-wire element 2a and a temperature correction element 2b which are both integral with a sensor unit 2. The air flow meter 1 detects the air flow rate in the sub-passage and obtains an output indicative of the total amount of intake air. In the passage of the air flow meter 1 is provided a throttle valve 3 which interlocks with the accelerator pedal of a vehicle and controls the amount of intake air. The air flow meter 1 is further provided with an idle speed control (ISC) valve 8 for controlling the flow rate of the air when the throttle valve 3 is fully closed (idling).

Fuel is supplied by a pump 506 from a fuel tank 505 and injected by injectors 507 into the intake manifold 501 so as to be supplied to the internal combustion engine 500 together with air.

The output signal of the sensor unit 2 of the hot-wire element 2a, the rotational angle signal of the throttle valve 3, the output signal of an oxygen concentration sensor 508 provided on an exhaust manifold 511, and the output signal of a rotational speed sensor 509, are input to a control unit 510 which calculates the amount of fuel to be injected, the opening angle of the idle speed control (ISC) valve, and in accordance with the results, so the control unit 510 controls the injectors 507, the ISC valve 8, and ignition timing equipment (not shown).

Referring to FIGS. 6-9, in FIGS. 6 and 7 examples are shown of the distribution of the axial flow rate immediately before the air flow meter 1 in the embodiment of the structure shown in FIG. 1, and FIGS. 8 and 9 show examples of distribution of the static pressure, especially in the case in which there are some bent portions in the intake duct 504 and the air flow meter 1 is disposed immediately after a bent portion, as in the embodiment of the system shown in FIG. 1. As seen from the examples of FIGS. 6 and 7, in the flow immediately before the air flow meter 1, the flow rate is high on the outside of the bend (on the lefthand side of each drawing) and low on the inside thereof (on the righthand side of each drawing), while the static pressure (shown in the examples of FIGS. 8 and 9) is high on the outside and low on the inside. In other words, there is a deflection in the flow immediately before the air flow meter 1. Examples 1 and 2 show the difference in the flow which may be caused by a combination of variation in the shape and the fixing positions of the filter 503 and the intake duct 504. In each example, amount of air flow is about 20 g/s.

Such a deflection of flow is well known as the flow immediately after a bent pipe (bend) in hydromechanics (e.g. *Hydraulics* by Matsuki Itaya; *Lectures on Mechanical Engineering* published by Japan Society of Mechanical Engineers and *Hydromechanics* by Yoshimasa Furuya and two others, published by Asakura Shoten). It is also known that two vortices (not shown in FIGS. 6 to 9) are produced following a right angle bend which when viewed transversely of the pipe are contra-rotating about respective halves of the pipe and from a secondary flow.

FIGS. 2 to 5 which show a first embodiment of a hot-wire air flow meter according to the present invention will now be described.

The air flow meter 20 has a body 20a, a throttle valve body 20b and an ISC valve body 20c which are die cast integrally with each other. At the entrance of the air flow meter body 20a, a rectifier lattice body (honeycomb) 40 is provided. In the downstream of the lattice body 40, a bridge 30 is formed by a transverse web 30c and a part circular member 30b and defines the sub-passage 31, the bridge 30 being die cast integrally with the body 20a across the main passage 21.

Figure 2:
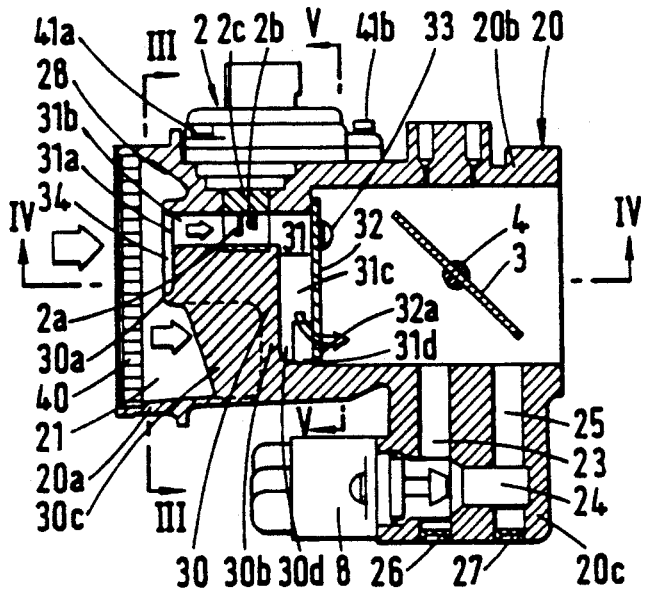
FIG. 2 is a sectional view of a first embodiment of a hot-wire air flow meter in accordance with this invention.
Figure 3:
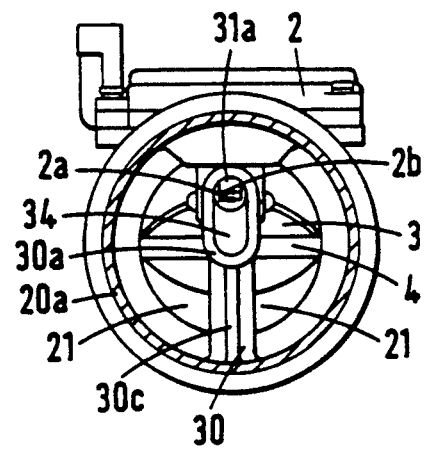
FIG. 3 is a sectional view of the embodiment shown in FIG. 2, taken along the line III—III.
Figure 4:
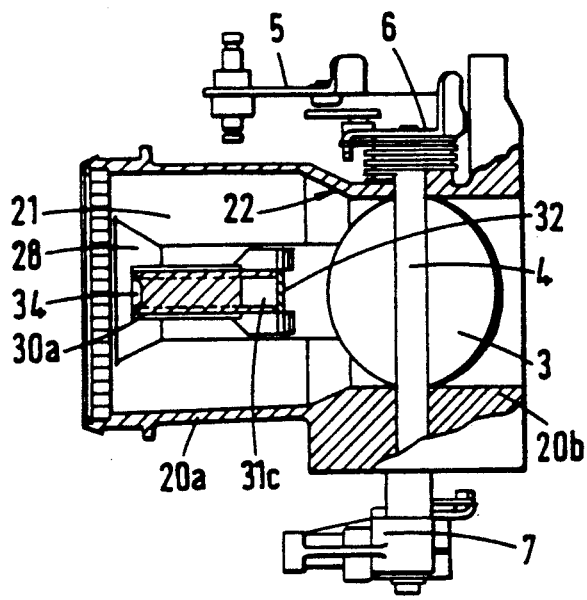
FIG. 4 is a sectional view of the embodiment shown in FIG. 2, taken along the line IV—IV.
Figure 5:
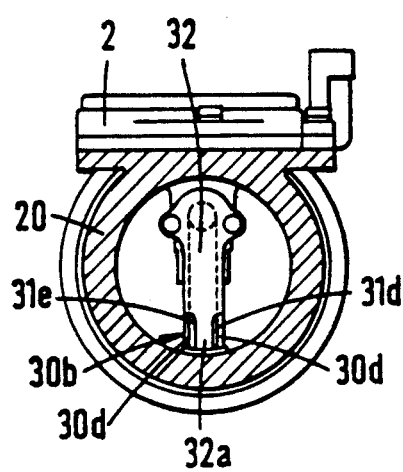
FIG. 5 is a sectional view of the embodiment shown in FIG. 2, taken along the line V—V.

The sub-passage 31 has a smaller diameter than the main passage 21 and is composed of an axial sub-passage 31b having a circular cross-section which is substantially parallel with the main passage axis but eccentric therewith. The axial sub-passage joins one end of the radial sub-passage 31c having a rectangular cross-section, the radial sub-passage being substantially orthogonal to the sub-passage 31b and the other end of the sub-passage 31c joins the main passage 21. The sub-passage 31c is composed of a groove provided at the end of the downstream of the bridge 30, and a cover 32 is fixed to the downstream end of the bridge 30 by a screw 33. The lower (as shown in FIGS. 2 and 5) end portion 32a of the cover 32 has a smaller width than the groove of the sub-passage 31c, but has such a configuration as to overlap with the exit opening (outflow portion) 31d of the sub-passage. The resistance to air flow of the sub-passage 31 is larger than that of the main passage 21 due to the fluid resistance of the rectangular cross-section passage being bent into an L-shape. By virtue of the above-described structure, most parts of the outer wall of the bridge 30 are in contact with the main current of the intake air, so that the temperature of the passage wall of the sub-passage 31b is maintained at a substantially equal temperature to the temperature of the intake air and the heat entering from the outside, such as from the engine, is cooled by the intake air, thereby enabling measurement of the air flow rate to be produced with only a small error. The force of backward flow of air such as caused by back fire of the internal combustion engine entering the sub-passage 31 is lessened by the lower (as viewed in FIGS. 2 and 5) end portion 32a of the cover which covers the exit opening 31d so as to protect the hot-wire element 2a, and element 2b. Since the passage 31c produces a resistance having an attenuating action to pulses, the hot-wire element 2a in the sub-passage is prevented from abnormal output due to pulsation.

The sensor circuit unit 2 has a hole having substantially the same diameter as the axial sub-passage 31b so that the hot-wire element 2a and the temperature correction element 2b are situated in the sub-passage 31b. A mold portion 2c which constitutes a part of the sub-passage 31b is screwed to the body 20a by screw members 41a, 41b in such a manner as to be inserted from the outside of the body 20a.

The upstream end of the axial sub-passage 31b has a circular entrance opening 31a located in a substantially flat base, i.e. downstream part of an oblong, dished, recessed, member 34 having a peripheral edge 30a which projects upstream from the entrance opening 31a and which forms an upstream end projection of the bridge 30. The edge 30a is disposed in the main passage 21 at position located inwardly from the main passage wall 20a. The edge 30a of the bridge 30 is so formed as to project in an upstream direction from an adjoining inclined wall surface 28 of the main passage 21 by a length equivalent to two times the depth of the recessed member 34.

In this embodiment, the entrance opening 31a is provided eccentrically at a position toward the upper portion in FIG. 2 of the base of the dished member 34, namely, closer to the sensor unit 2. The opposite portion of the dished member 34 with respect to the entrance opening 31a is extended substantially toward the center of the main passage 21, and the axial depth of the dished member 34 is about the same as the radius of the axial sub-passage 31b. Provision of the recessed member 34 makes the air flow to the sub-passage 31 insensitive to differences in the upstream air flow caused by the variations of the shapes and the fixing states of the air cleaner and the intake duct having bent portions, as shown in FIGS. 6 to 9. In other words, the distribution of the flow rate to the sub-passage 31 is stabilised by the member 34 which may, therefore, be considered as a stabilising member. This embodiment is especially effective in the case in which there is no alternative but to dispose the entrance opening 31a immediately after an intake duct having a bent portion.

As described above, since the entrance opening 31a is eccentric toward the sensor unit 2, the effective length of the radial sub-passage 31c can be increased to more than the radius of the main passage 21. A lower end portion 30b of the bridge 30 has a part circular side wall 30d having a height in the meter axial direction about ½ the depth of the radial sub-passage 31c measured in the meter axial direction and the lower end portion 30b in conjunction with wall 30d serve as an effective air breaking wall with respect to the exit opening 31d, which is situated slightly below (as shown in FIG. 2) the downstream throttle valve shaft 4 to thereby prevent the flow in the exit opening 31d from disturbing the main air flow current. A rib 30c is provided chiefly for the purpose of improving the melt flow at the time of die casting, but it also has an effect to prevent transverse circulation of the main air flow current. These portions of the bridge 30 stabilise the flow and reduce the noise of the output of the hot-wire element 2a.

A necked portion 22 of the main passage wall is provided slightly downstream from the exit opening 31d of the sub-passage 31c to stabilise the flow in the sub-passage 31 with respect to the movement of the throttle valve 3; in other words, to stabilise the distribution of the air flow of the main passage 21 and the sub-passage 31 and, as a result, enable the throttle valve 3 to be provided in proximity to the air flow meter. In this respect, the throttle valve 3 for controlling the amount of air is located downstream of the hot-wire meter and the valve shaft 4 for driving the throttle valve 3 penetrates the body 20b. On the exterior of the body 20b are provided a lever mechanism 5 for driving the shaft 4, a spring 6 and a throttle position sensor 7 for detecting the rotational angle of the shaft. At a portion of the ISC valve body 20c are provided the ISC valve 8 for controlling the amount of air flow rate during the idling of the internal combustion engine and air passages 23, 24 and 25 to the ISC valve 8. Since the passages 23 and 25 are formed from the outside of the body 20c, plugs 26 and 27 are used to fill the unnecessary hole portions.

In this embodiment, it is possible to realise a hot-wire air flow meter at a low cost which is capable of measuring the amount of intake air flow of an internal combustion engine with accuracy and high reliability even where there is a very complicated intake passage upstream of the air flow meter and there is a wide variation in the shape and the connection of the intake passage, the meter having a short axial dimension and being light in weight. It is therefore possible to realise an engine system which is capable of achieving a cleaner exhaust gas and reduction in fuel used.

Figure 10:
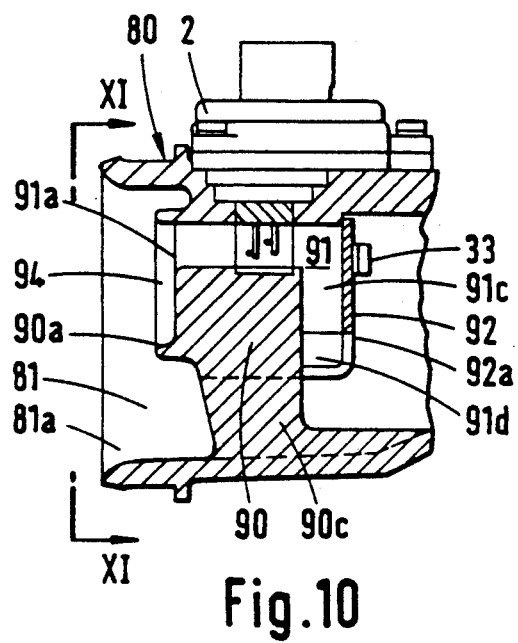
FIG. 10 is a sectional view of a second embodiment of a hot-wire air flow meter in accordance with this invention.
Figure 11:
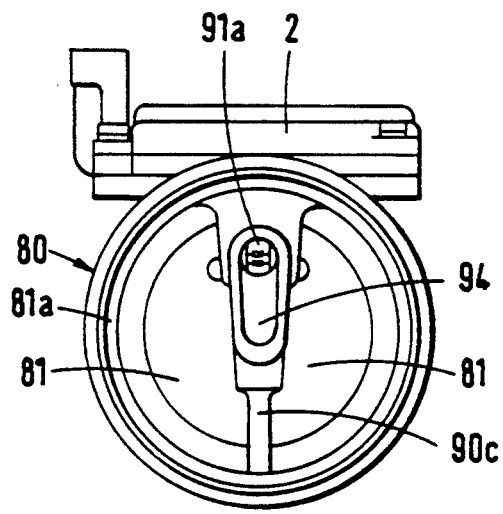
FIG. 11 shows the second embodiment shown in FIG. 10, viewed in the direction XI—XI indicated by the arrows.

FIGS. 10 and 11 show a second embodiment of a hot-wire air flow meter according to the present invention. The entrance opening 91a of a sub-passage 91 is provided at the base portion of a recessed member 94 which is fundamentally the same as the recessed member 34 in the first embodiment. In place of the rectifying member honeycomb 40 in the first embodiment, a throat portion 81a is provided at the entrance portion of a main passage 81. Provision of the throat portion 81a reduces the diameter of the main passage, thereby reducing the pressure loss and the maximum flow rate of the main passage 81 which exerts influence on the distribution of the air flow in the sub-passage 91. Therefore, the lower end (as viewed in FIG. 10), portion 90c, of a bridge 90 is only composed of a rib member, so that the minimum cross-section of the main passage is greatly reduced in comparison with that in the first embodiment.

A cover 92 constituting a radial sub-passage 91c is fixed by the screw 33 to the downstream end of the bridge 90 which is integral with a body 80. The width of a lower end portion 92a of the cover 92 is slightly smaller than the width of the groove of the sub-passage 91c, as in the first embodiment. The lower end portion 92a is bent toward the upstream in the axial direction so as to cover the exit opening 91d of the sub-passage 91c. The end of the lower end portion 92a of the cover 92 is substantially in contact with the downstream end of the bridge over the rib 90c. In this way, any disturbance of the main air flow current by the lower end portion 92a of the cover 92 is prevented and it is possible to make the power of the backward flow entering the sub-passage 91 less than that in the first embodiment.

The throat portion 81a at the entrance of the air flow meter is not as satisfactory as a rectifying member such as a honeycomb with respect to a strong circulating current, but it has the action of reducing the boundary layer produced in any upstream bent portion and of suppressing the disturbance produced within the boundary layer by the virtue of the venturi effect. Thus, this embodiment is used where a lower cost is required than the cost of the first embodiment. The pressure loss can be kept equal to or smaller than that in the first embodiment because there is no honeycomb.

Figure 12:
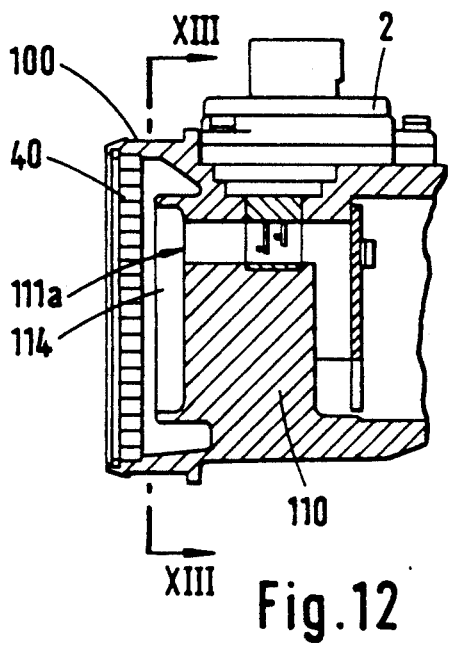
FIG. 12 is a sectional view of a third embodiment of a hot-wire air flow meter in accordance with this invention.
Figure 13:
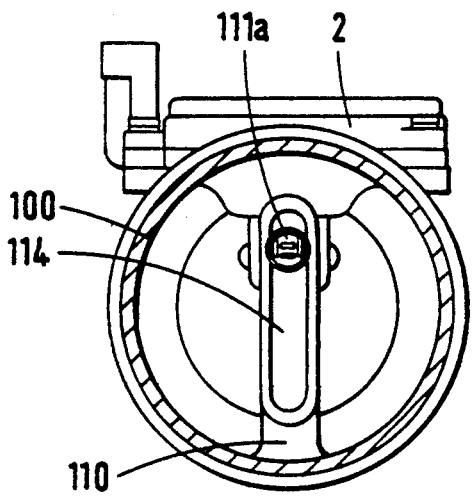
FIG. 13 is a sectional view of the embodiment shown in FIG. 12, taken along the line XIII—XIII.

FIGS. 12 and 13 show a third embodiment of a hot-wire air flow meter according to the present invention. A recessed member 114 is provided at the upstream end of a bridge 110 which is integral with a body 100 and the entrance opening 111a of a sub-passage is provided at the base portion of the dished, recessed, member 114. This embodiment is different from the first embodiment in that the recessed member is also extended upwardly (as shown in FIG. 12) of the entrance opening portion 111a, and in that the portion of the recessed member below the entrance opening 111a is longer. This structure enables the pressure to be averaged over a wide range. In this case, however, the function is not effective unless the depth of the recessed member 114 is set to be larger than in the first and second embodiments.

FIGS. 14 and 15 show a fourth embodiment of a hot-wire air flow meter according to the present invention. A recessed member 134 is composed of two parallel edges 130a projecting upstream at the end of a bridge 130 which is integral with a body 120 and the inner walls 120a, 120b of the entrance of the air flow meter and the base surfaces 134a, 134b of the dished, recessed, member 134 are formed as a continuous smooth wall surface. The base surfaces 134a and 134b of the recessed member 134 have a gentle inclination toward the entrance opening 131a of a sub-passage 131.

The entrance inner walls 120a, 120b, which are shown vertically in the drawings, reduce the air current and stabilise the flow along the wall surfaces. The inclination of the base surfaces 134a, 134b makes the air stagnating in the recessed member 134 readily flow toward the entrance opening 131a. By virtue of this structure, stable distribution of air flow and a lower noise of the output of the hot-wire element, such as is shown in FIGS. 6 to 9, can be realised without a honeycomb.

FIGS. 16 and 17 show a fifth embodiment of a hot-wire air flow meter according to the present invention. A dished, recessed, member 154 is composed of an edge 150a projecting upstream from an end of a bridge 150 which is integral with a body 140. This embodiment is different from the first embodiment in that the recessed member 154 is provided in the shape of a sectorially shaped fan in the upper portion of FIGS. 16 and 17 such that the entrance opening 151a of a sub-passage 151 constitutes the pivot of the fan. The upper portion (shown in FIG. 16) of the base of the recessed member 154 is substantially flat. This embodiment is especially effective in the case where the meter is to be located close to a bend and in the entrance opening 151a of the sub-passage is arranged to be orthogonal to a line connecting the inside and the outside of the bend. Since the variation of the air speed is large in the vicinity of the inside wall, as shown in the distribution of the speed in FIGS. 6 and 7, averaging this portion is an effective countermeasure.

Figure 18:
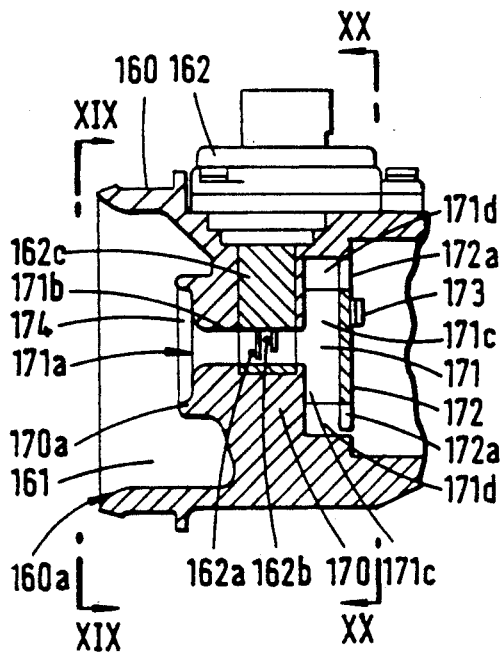
FIG. 18 is a sectional view of a sixth embodiment of a hot-wire air flow meter in accordance with this invention.
Figure 19:
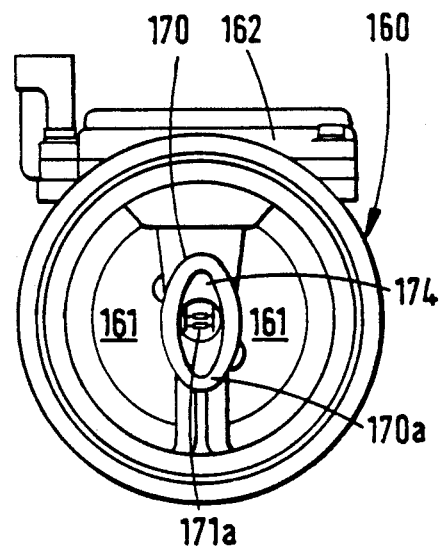
FIG. 19 is a sectional view of the embodiment shown in FIG. 18, taken along the line XIX—XIX.
Figure 20:
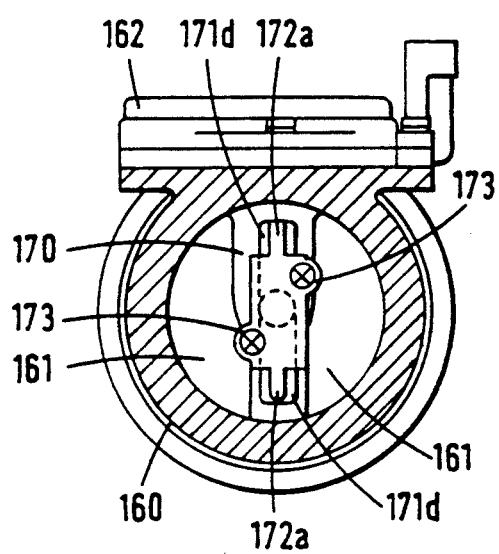
FIG. 20 is a sectional view of the embodiment shown in FIG. 18, taken along the line XX—XX.

FIGS. 18 to 20 show a sixth embodiment of a hot-wire air flow meter according to the present invention. A recessed member 174 is surrounded by an oval edge 170a projecting upstream at the upstream end of a bridge 170 which bridge is integral with a body 160, and the entrance opening 171a of the sub-passage 171 is provided at the base portion of the dished, recessed, member 174, the base thereof being substantially flat. This embodiment is different from the first to fifth embodiments in that the longitudinal axis of an axial sub-passage 171b is coaxial with the longitudinal axis of the main passage 161, and upper and lower (as shown in FIG. 18) radial sub-passages 171c are provided. Therefore, a cover 172 for the radial sub-passages 171c has the form of a plate with both upper and lower end portions 172a thereof having a smaller width. Two exit openings 171d are naturally provided on the sub-passage 171c at the upper portion and the lower portion, respectively, as shown in FIG. 18. A long molded portion 162c of a sensor unit 162 is provided so that sensors 162a and 162b are situated within the axial sub-passage 171b.

The entrance wall 160a of the air flow meter body 160 adopts the configuration of a venturi as in the second embodiment.

In this embodiment, since the flow at the central portion is fundamentally stable, a more stable property is obtained than the experiments which will be described later, but increase in the length of the molded portion 162c of the sensor unit 162 disadvantageously leads to a rise in cost.

Figure 21:
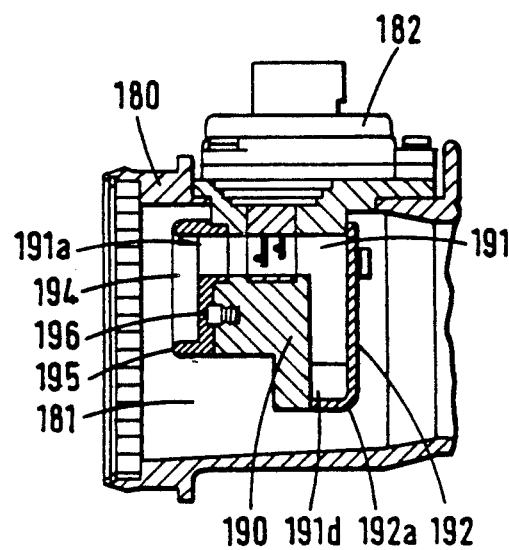
FIG. 21 is a sectional view of a seventh embodiment of a hot-wire air flow meter in accordance with this invention.

FIG. 21 shows a seventh embodiment of the present invention. A sensor circuit unit 182 is fixed to the block for holding the hot-wire elements which block is provided separately from a body 180. An entrance member 195 of a sub-passage 191 has a dished, recessed, portion 194 is fixed at the upstream end of a bridge 190 by a screw 196, as shown in FIG. 21. The entrance opening 191a of the sub-passage 191 is provided in the flat base portion of the recessed portion 194 of the member 195 and the upstream projecting edge of member 195 surrounds opening 191a to separate it from the main passage 181. The lower end portion 192a of a cover member 192 which is fixed to the downstream end of the bridge 190 is bent toward the upstream in the same way as in the second embodiment shown in FIG. 10. This is because while the hot-wire element holder block is integral with the body in each of the first to sixth embodiments, these elements are separate from each other in the structure of this embodiment and the main passage 181 is also situated at the lower (as shown in FIG. 21) end portion of the block 190.

This structure has the disadvantage that the number of parts increases, but has the advantage of easy maintenance since parts may be replaced. In addition, since it is possible to position the member 195 which constitutes the recessed portion 194 at a position slightly rotated around the entrance opening 191a by changing the fixing position of the screw 196, this embodiment can cope with a wider range in the shapes of the elements of the upstream intake pipe and the positions for mounting the air flow meter.

Figure 22:
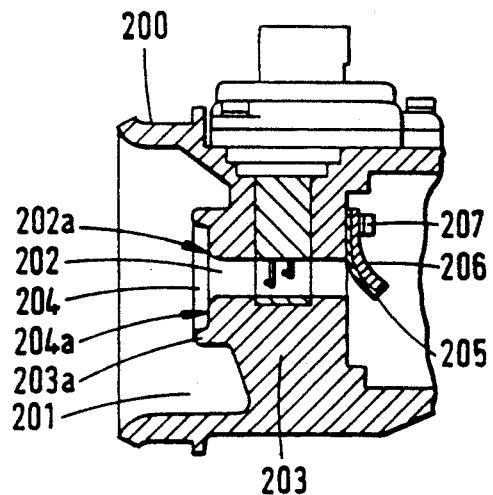
FIG. 22 is a sectional view of an eighth embodiment of a hot-wire air flow meter in accordance with this invention.

FIG. 22 shows an eighth embodiment of the present invention. In the interior of a bridge 203, which is integral with a body 200, a sub-passage 202, which consists only of an axial sub-passage is provided coaxially with a main passage 201. The upstream end of the bridge 203 constitutes an edge 203a surrounding a flat portion 204a formed around the entrance opening 201a of the sub-passage 201, thereby constituting a dished, recessed, member 204. To the outflow portion of the sub-passage 202 is provided a check valve (stabilising means) 205 made of a thin steel sheet having a retainer 206 which serves as the stopper of the check valve 205, both being fixed by a screw member 207. The check valve 205 is deformed toward the downstream side when the flow is normal, as shown in FIG. 22, and when the flow is reversed, the check valve 205 closes the exit (i.e. right hand end as viewed in FIG. 22) of the sub-passage 202.

Figure 23:
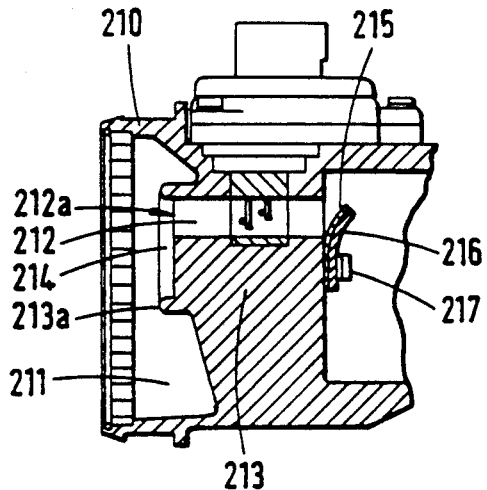
FIG. 23 is a sectional view of a ninth embodiment of a hot-wire air flow meter in accordance with this invention.

FIG. 23 shows a ninth embodiment of the present invention. In the interior of a bridge 213, which is integral with a body 211, is a sub-passage 212 which consists only of an axial extending sub-passage that is eccentric with respect to a main passage 211. A dished, recessed, member 214 is formed at the upstream end of the bridge 213 and member 214 has an upstream projecting edge 213a which peripherally surrounds an entrance opening 212a of the sub-passage 212 provided at the flat base portion of the recessed member 214. The edge 213a thus separates the opening 212a from the main passage 211. To the outflow portion, i.e. downstream end, of the sub-passage 212 is provided a backward flow preventive valve (stabilising means) 215 made of a thin steel sheet which is secured with a retainer 216 by a screw 217.

Figure 24:
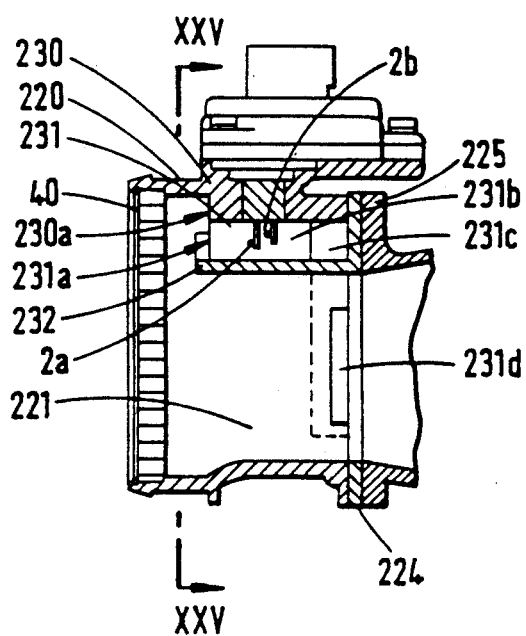
FIG. 24 is a sectional view of a tenth embodiment of a hot-wire air flow meter in accordance with this invention.
Figure 25:
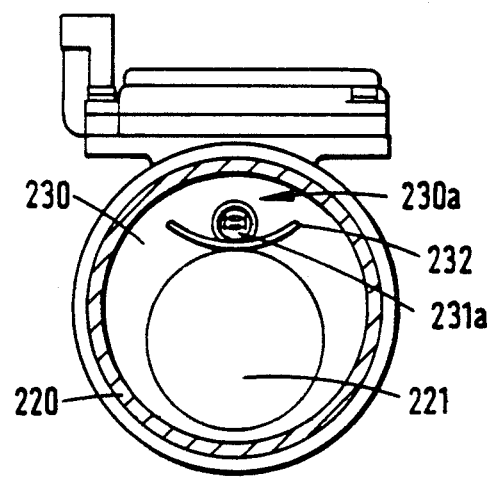
FIG. 25 is a sectional view of the embodiment shown in FIG. 24, taken along the line XXV—XXV.

FIGS. 24 and 25 show a tenth embodiment of the present invention. In the interior of a thick-walled portion 230 of a body 220, are formed a sub-passage 231 consisting of an axial sub-passage 231b which is parallel to a main passage 221 and an arcuate circularly cross-sectioned passage 231c which traverses around the outer periphery of the main passage 221, and the exit opening 231d of the sub-passage 231 is disposed at the inner wall of the main passage 221. A pipe body 225 on the downstream side and the body 220 are connected with each other through a packing piece 224. The upstream end surface of the thickwalled portion 230 of the sub-passage 231 constitutes a flat surface 230a perpendicular to the air flow, and on this surface the entrance opening 231a of the sub-passage 231 is disposed. A curved member 232 extends upstream from and partially around entrance 231a to prevent the air flow at the portion of the flat surface 230a from flowing out to the main passage 221. Provision of the member 232 stabilises the static pressure in the vicinity of the entrance opening 231a and serves to separate the sub-passage entrance from the main passage. As a result, the distribution of the air flow in the sub-passage 231 and the main passage 221 is stabilised with respect to a change in the velocity distribution in the air flow on the upstream side caused by, for example, a change in the upstream conditions.

Figure 26:
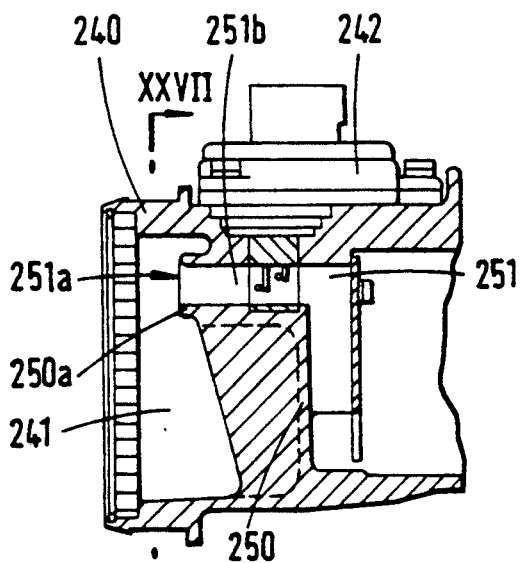
FIG. 26 is a sectional view of a prior art hot-wire air flow meter.
Figure 27:
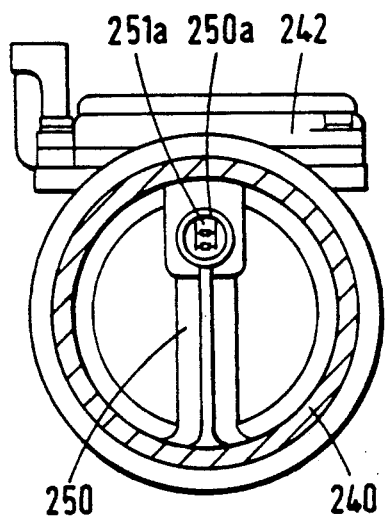
FIG. 27 is a sectional view of the prior art shown in FIG. 26, taken along the line XXVII—XXVII.

FIGS. 26 and 27 show the structure of a conventional air flow meter, which is an object for comparison for showing the advantages of the present invention. An edge 250a at the upstream end of a bridge 250 which is integral with a body 240 is formed by merely projecting the edge from the upstream end in the form of a cylinder. The uppermost stream portion of the edge 250a therefore constitutes an entrance opening 251a. A sub-passage 251b which is parallel to a main passage 241 is eccentrically positioned with respect to the main passage 241, being offset toward a sensor circuit unit 242.

Figure 28:
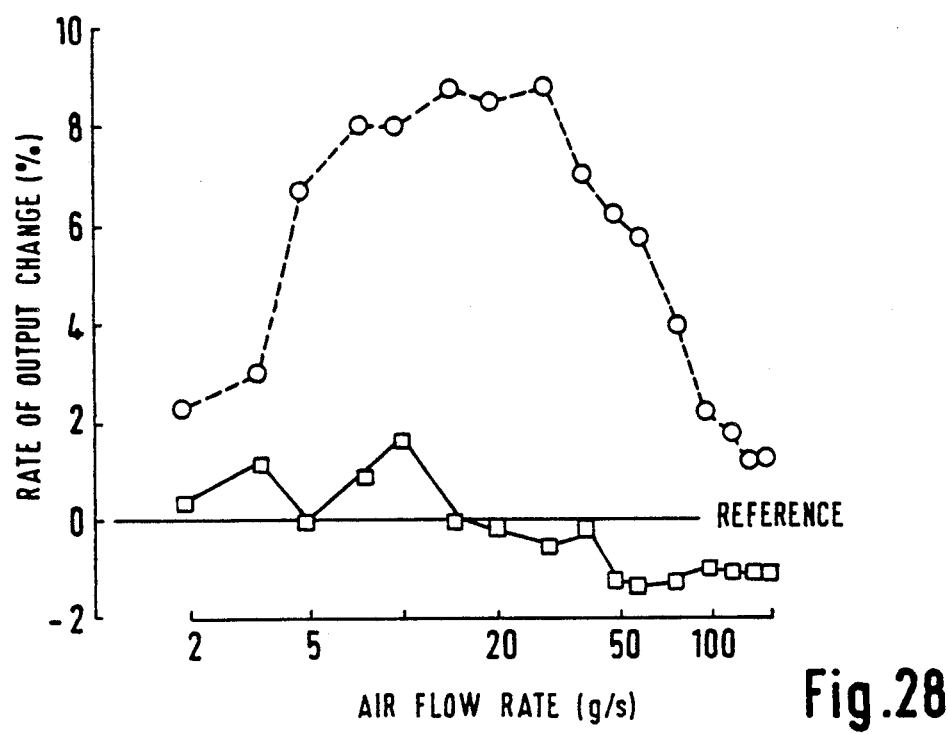
FIG. 28 shows in graphical form results of experiments.

FIG. 28 shows the results of experiments with an air flow meter which is disposed as in the embodiment of the system shown in FIG. 1, that is, on the downstream side of air flows such as those shown in FIGS. 6 to 9. Experiments were carried out with the conventional air flow meter shown in FIGS. 26 and 27 and the first embodiment of the present invention shown in FIGS. 2 to 5. The abscissa in FIG. 28 represents the mass flow rate (q/s) of the air which flows in the air flow meter. Since the mass flow rate covers a wide range, the abscissa is graduated in a logarithmic scale. The ordinate represents the rate of output change (%) of the hot-wire meter. The output varies in accordance with the differing shapes of air filter, the intake duct and the error in the fixing state of the intake duct. A combination of air filter, intake duct and fixing thereof in which the variation of output is minimum was selected as the reference (output variation is zero), and the change of the measured outputs is represented as the rate of output change (%). As is clear from the results of the experiments, the conventional air flow meter represented by the broken line shows a flow rate variation of up to 8%, while the structure of the present invention represented by the solid line shows a flow rate variation within ±2%.

Thus, in the present invention, since the change in the flow on the upstream side due to the variations of the intake pipe elements is substantially cancelled and the backward flow to the sub-passage due to back fire or blow back and the disturbance of the flow due to the mixture at the exit portion of the sub-passage are prevented, it is possible to measure the air flow accurately under various conditions.

Having fully described the present invention, it will now be understood that by providing a flow stabilising means to the entrance a sub-passage in a hot-wire air flow meter, the measurement accuracy of amount of intake air by a hot-wire element is enhanced, and by providing means such as a radial sub-passage or a flexing member at the output of the sub-passage the backward flow to the sub-passage due to back fire or blow back and the disturbance of the flow due to the mixture at the exit portion of the sub-passage is prevented, so that it is possible to measure the air flow accurately under various conditions.

It is to be understood that various modifications may be made and that all such modifications falling within the spirit and scope of the appended claims are intended to be included in the present invention.

We claim:

1. A hot-wire air flow meter for detecting air flow intake includes a main passage, a sub-passage bypassing said main passage, a hot-wire element located in said sub-passage for detecting said air flow intake, and a dished member upstream from an inlet of said sub-passage, said dished member having a base portion adjacent said sub-passage inlet and an upstream projecting edge extending from said base portion, said projecting edge at least partially surrounding said inlet and being located between said inlet said main passage, whereby said dished member tends to stabilize air flow entering said sub-passage by said inlet.

2. A hot-wire air flow meter as claimed in claim 1 wherein the base portion is substantially orthogonal to the longitudinal axis of the main passage and said base is substantially flat.

3. A hot-wire air flow meter as claimed in claim 1 wherein said edge entirely surrounds said inlet.

4. A hot-wire air flow meter as claimed in claim 1 wherein said sub-passage has a longitudinal axis which is substantially parallel with but eccentric from the longitudinal axis of the main passage and said sub-passage is positioned toward one side of the base portion.

5. A hot-wire air flow meter as claimed in claim 4 wherein said sub-passage is positioned adjacent said edge.

6. A hot-wire air flow meter as claimed in claim 1 wherein said edge extends toward the longitudinal axis of said main passage.

7. A hot-wire air flow meter as claimed in claim 1 wherein said edge extends across the longitudinal axis of said main passage.

8. A hot-wire air flow meter as claimed in claim 1 wherein said dished member base portion and a projecting edge are oblong in shape.

9. A hot-wire air flow meter as claimed in claim 8 wherein a major part of said oblong is eccentric with respect to the longitudinal axis of said main passage.

10. A hot-wire air flow meter as claimed in claim 1 wherein the base portion and the projecting edge are fan-shaped with the axis of the fan locating the inlet.

11. A hot-wire air flow meter as claimed in claim 1 wherein the main passage has a radially inwardly directed wall, inclined inwardly downstream, and the projecting edge extendingly projects upstream therefrom.

12. A hot-wire air flow meter as claimed in claim 11 wherein the distance said edge projects upstream from said inclined wall is approximately twice the depth of the dished member.

13. A hot-wire air flow meter as claimed in claim 1 wherein the edge adjoins an inner wall of said main passage, said inner wall of said main passage having an inlet thereof formed in the shape of a venturi.

14. A hot-wire air flow meter as claimed in claim 1 wherein the sub-passage is co-axial with the longitudinal axis of the main passage.

15. A hot-wire air flow meter as claimed in claim 14 wherein the dished member has a base and a projecting edge which are both oval with the minor axis of said oval being orthogonal to the longitudinal axis of said main passage.

16. A hot-wire air flow meter as claimed in claim 1 wherein the depth of the dished member is substantially the same as the radius of the sub-passage.

17. A hot-wire air flow meter as claimed in claim 1 wherein the sub-passage extends from said dished member to a radially extending passage, a radially outer end of said radial passage communicating with a downstream end of said main passage.

18. A hot-wire air flow meter as claimed in claim 17 wherein a baffle plate is provided to partially cover a downstream outlet of the radial passage.

19. A hot-wire air flow meter as claimed in claim 1 wherein flexible closure means are provided at the downstream end of said sub-passage, said flexible closure member being arranged to open or close the outlet of said sub-passage in dependence upon the direction of air pressure.

20. A hot-wire air flow meter as claimed in claim 1 wherein said sub-passage is parallel to but eccentric from the longitudinal axis of the main passage and arcuately located partly about an entrance of said sub-passage at the upstream end thereof is a plate, said plate being positioned between the sub-passage and main passage, a base part of the dished member being positioned radially outwardly from the sub-passage with respect to the main passage longitudinal axis, said base part being substantially orthogonal with respect to said main passage longitudinal axis.

21. A hot-wire air flow meter as claimed in claim 20 wherein the downstream end of said sub-passage is arcuately formed about the main passage and enters into the main passage at a circumferential portion thereof angularly spaced from said sub-passage.

22. A hot-wire air flow meter as claimed in claim 1 wherein said sub-passage is formed in a bridge extending radially of the main passage longitudinal axis, said bridge being formed integrally with a body of said meter, and said main passage being divided into two parts by said bridge.

23. An internal combustion engine including a hot-wire air flow meter according to claim 1, a speed sensor for detecting the rotational speed of said internal combustion engine, at least one fuel injector for injecting fuel, and a control unit for controlling the amount of fuel injection by receiving output signals of said hot-wire air flow meter and said speed sensor and calculating said amount of fuel injection corresponding to the amount of intake air.

* * * * *

UNITED STATES PATENT AND TRADEMARK OFFICE
CERTIFICATE OF CORRECTION

PATENT NO. : 4,991,560
DATED : February 12, 1991
INVENTOR(S) : Nobukatsu ARAI, et al.

It is certified that error appears in the above-identified patent and that said Letters Patent is hereby corrected as shown below:

Column 13,

Claim 1, line 10, after "inlet" insert -- and --.

Signed and Sealed this

Sixteenth Day of November, 1993

Attest:

BRUCE LEHMAN

Attesting Officer

Commissioner of Patents and Trademarks